Dec. 2, 1941. C. W. GUYATT 2,264,439
NONMETALLIC SHEATHED CABLE
Filed July 12, 1940
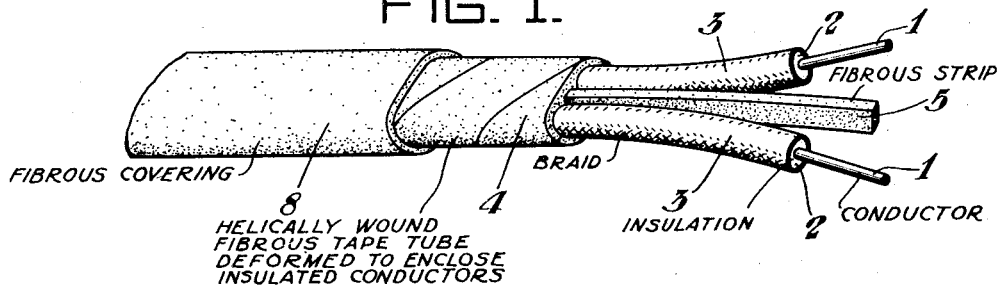
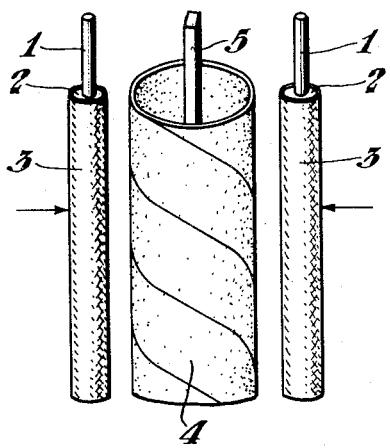
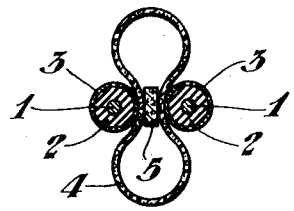
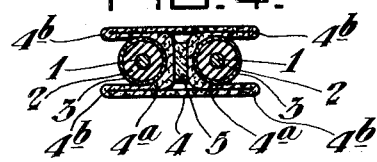
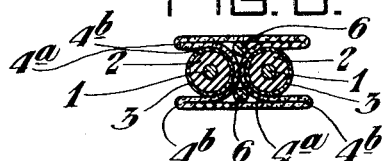
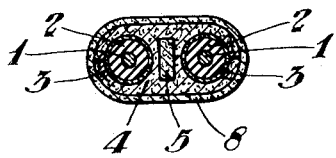
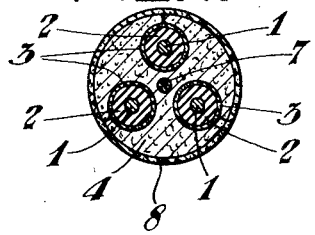
Inventor:
CECIL W. GUYATT,
by: John E. Jackson
His Attorney.

Patented Dec. 2, 1941

2,264,439

UNITED STATES PATENT OFFICE 2,264,439

NONMETALLIC SHEATHED CABLE

Cecil W. Guyatt, Shrewsbury, Mass., assignor to The American Steel and Wire Company of New Jersey, a corporation of New Jersey Application July 12, 1940, Serial No. 345,215

8 Claims. (Cl. 174—116)

This invention relates to non-metallic sheathed cable of the type used in the wiring of residences, offices, etc.

Specific examples of such cables embodying the principles of the invention are illustrated by the accompanying drawing, in which:

Figure 1 is a perspective of a partially opened two-conductor cable;

Figure 2 is a perspective of this cable in its first assembling phase;

Figures 3 through 5 are cross sections of this cable in successive assembling phases;

Figure 6 is similar to Figure 4 but shows a modification; and

Figure 7 is a cross section of an assembled three-conductor cable.

More specifically, the conductor elements each consists of a tinned copper conductor 1 of stranded construction carrying insulation 2 consisting of a covering of rubber, rubber compound, or other suitable insulating material. A fibrous covering 3 may be applied over the insulation 2, this covering 3 being suitably colored so that the polarity of the conductors may be determined by the installer, this requiring the coloring to be different in the case of the different conductor elements. This covering 3 may be braid or serving and, in addition to being colored, may be covered or saturated with a moisture-resisting compound. As so far described, the construction of the cable may follow the prior art.

The construction is unconventional in that it includes a tube 4 of helically wound fibrous tape that is covered or saturated with a moisture-resisting compound and has its wall formed to provide parallel inward grooves 4ª in which the conductor elements are positioned with portions 4ᵇ of the wall bounding the grooves 4ª bent together, this completely enclosing the conductor elements.

A fibrous strip 5 may be positioned inside the tube 4 between the portions of its wall forming the bottoms of the grooves 4ª or, as in the case of the modification, these portions of the tube wall may contact and fillers 6 may be placed inside of the tube in the valleys formed on either side of these contacting portions. In the case of the three-conductor cable, a single round fibrous strand 7 is shown in the axis of the cable, the construction otherwise being the same as the two-conductor cable excepting for its use of three-conductor elements. In all cases, the fibrous parts 5, 6 and 7 may be covered or saturated with a moisture-resisting compound. If desired, these parts may be substituted by other elements such as by a grounding wire.

The tube 4 functions as non-metallic armor. As mentioned, it is made of tape and therefore it may be continuously produced by wrapping the tape around a mandrel, each convolution of the tape butting or overlapping the others and the tube thus formed coming off the mandrel continuously. During this process any of the elements 5, 6 or 7, or any other elements to be placed inside the tube, may be positioned by making the mandrel hollow and running the desired elements through the mandrel so as to appear within the tube being produced. The tape from which the tube is made may be of any relatively thick, fibrous material providing it is tough and elastic. Kraft paper or what is known as "wrinkled and krinkled" paper, or a woven tape of cotton or jute, may all be used. These tapes may be covered or saturated with a moisture-resisting compound so that this compound appears on or in the resulting tube.

In the process of assembling the cable, the conductor elements are fed parallel with the tube directly opposite each other with the tube centered between them, any elements to be included inside the tube being already in place by reason of being fed through the hollow mandrel on which the tube is produced. This phase of the assembly is shown by Figure 2. The next step is to run the tube and the conductor elements through forming dies so as to press the conductor elements together to the relationship they are to have in the case of the completed cable, this phase being shown by Figure 3.

At this time the tube is caused to bulge between the conductor elements, and these bulging portions are then pressed radially inwardly to cause the formation of the grooves 4ª containing the conductor elements, this being done by the use of a die of suitable shape and the result being shown by Figure 4. The final step is to again pass the parts through a die so as to press the wall portions 4ᵇ together and effect enclosure of the conductor elements, this resulting in the formation of an armor completely around the conductor elements and which protects them from mechanical injury. Subsequently the same procedure is followed in the case of the three-conductor cable.

It is considered preferable to wrap a light binder thread around the formed assembly to assist in holding it in shape for the final step which consists in placing a fibrous covering 8 over the tube 4. This covering 8 may be braid, or wrap or serving made of cotton, or other fibrous material. It may be treated or impregnated to render the cable as a whole fire-resisting and reasonably moisture-proof. Also, a surface finish or light covering may be finally applied such as stearin or wax, along with a light application of mica flakes to further increase its moisture-resisting ability and to smooth the surface so as to render the cable easier to handle.

A cable constructed as described is a homogeneous, compact structure which is relatively inexpensive to manufacture. The use of the helical non-metallic armor provides a compact and tough structure completely surrounding the individual conductors, thereby providing excellent mechanical protection as well as increasing the electrical protection.

The lack of large voids and open interstices reduce the possibility of included air which would assist combustion, this lack also reducing the possibility of moisture absorption. Although the use of the helical non-metallic armor is such that the armor thoroughly surrounds the conductor elements in a compact manner, the fact that the armor is made up of a helically wound tape means that the cable has a spring-like action in the direction of the usual bending of the cable, this causing a consequent gain in flexibility.

Along with the gain in flexibility and because of the compact thorough coverage provided by this invention, the cable provides material resistance to impact and compression forces, which is of value during installation of the cable and to resist the conditions inherent in its use. In addition, a cable made in accordance with the present invention is readily stripped for connection purposes by the installer, since the non-metallic sheath is readily removed by pulling once the cable is opened up. Also there may be less fillers and individual conductor wraps to remove as compared to the prior art cable of similar type. Because of the completeness with which the helical non-metallic armor covers the conductor elements, what is known as a "bleeder" tape is not required under the outer covering 8 to prevent the saturating material used in this covering from affecting the efficiency of the coloring carried by the conductor elements.

In addition to all the foregoing, because of the fact that the wall of the tube of helically wound fibrous tape is molded under pressure during the various die forming operations, there are no voids requiring the use of fillers solely for the purpose of rounding out or improving the symmetry of the cable. The parts 5, 6 and 7 are for the purpose of effecting conductor spacing or increasing the tensile strength of the cable. They are not used simply to fill space.

I claim:

1. An electric cable including insulated electric conductor elements and a tube having its wall deformed to provide spaced inwardly directed longitudinal grooves, said elements lying in said grooves and the portions of said wall bounding said grooves being bent together over said elements and provided with means for holding them bent together.

2. An electric cable including insulated electric conductor elements and a tube having its wall deformed to provide longitudinal inward grooves, said elements lying in said grooves and the portions of said wall bounding said grooves being bent together over said elements and provided with means for holding them bent together, said tube being made of helically wound non-metallic tape material.

3. An electric cable including insulated electric conductor elements and a tube having its wall deformed to provide longitudinal inward grooves, said elements lying in said grooves and the portions of said wall bounding said grooves being bent together over said elements and provided with means for holding them bent together, said tube being made of non-metallic material and containing at least one element extending longitudinally therethrough for increasing the tensile strength of the cable.

4. An electric cable including electrically insulated electric conductors, a tube of helically wound fibrous tape having its wall deformed to provide spaced inwardly directed longitudinal grooves, said conductors lying in said grooves and the portions of said wall bounding said grooves being bent together to enclose said conductors and a jacket over said tube.

5. An electric cable including electrically insulated electric conductors, a tube of helically wound fibrous tape having its wall deformed to provide spaced inwardly directed longitudinal grooves, said conductors lying in said grooves and the portions of said wall bounding said grooves being bent together to enclose said conductors, and a jacket over said tube, said insulated conductor carrying identifying coloring and said jacket being saturated with a material that might normally bleed through to destroy the efficiency of said coloring, said tube preventing said material from affecting said coloring.

6. A non-metallic sheathed cable for the wiring of buildings and the like, said cable comprising rubber insulated electric conductors, a tube of helically wound fibrous tape carrying a moisture-resisting compound and having its wall formed to provide longitudinal inward grooves in which said conductors are positioned with portions of said wall bounding said grooves bent together to enclose said conductors, at least one tension carrying element inside said tube and a braid covering said tube and carrying moisture and fire-resisting material.

7. A non-metallic sheathed cable for the wiring of buildings and the like, said cable comprising rubber insulated electric conductors, a tube of helically wound fibrous tape carrying a moisture-resisting compound and having its wall deformed to provide spaced inwardly directed longitudinal grooves in which said conductors are laid with portions of said wall bounding said grooves bent together to enclose said conductors, at least one tension carrying element extending longitudinally inside said tube and a jacket covering said tube and carrying moisture and fire-resisting material, said fibrous tape being thick and elastic so as to provide the cable with the required mechanical protection for said insulated conductors when said wall is deformed as defined.

8. A method of making an electric cable, comprising positioning a preformed flexible tube and electric conductor elements in parallel relation with said elements outside said tube, pressing said elements radially into said tube to cause the wall of the latter to oppositely indent and bulge from said elements, pressing the bulging portions of said tube toward said elements to cause the formation of grooves in said tube containing said elements, bending together the portions of said tube bounding said grooves about said element to enclose them and binding said tube to maintain said elements enclosed.

CECIL W. GUYATT.